March 15, 1966 L. A. TURZILLO 3,240,513
CONTINUOUS FLIGHT AUGER CONNECTOR
Filed Nov. 27, 1963
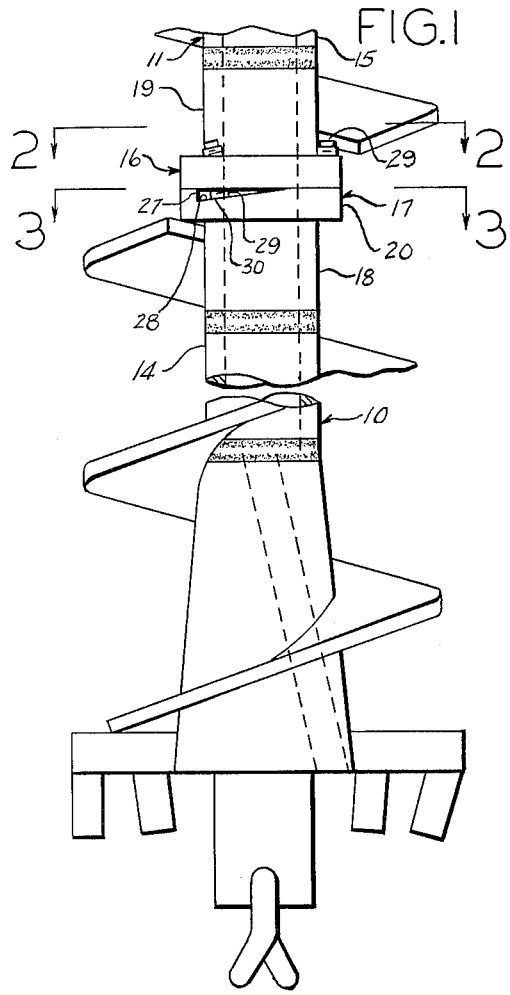
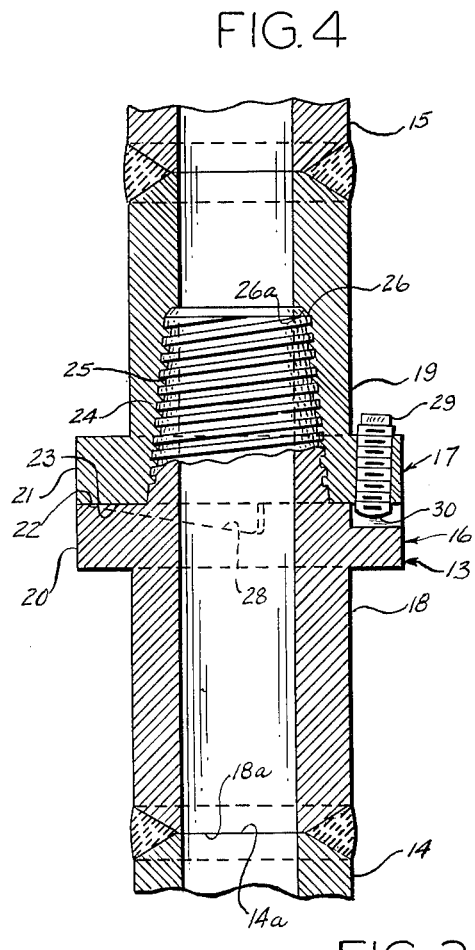
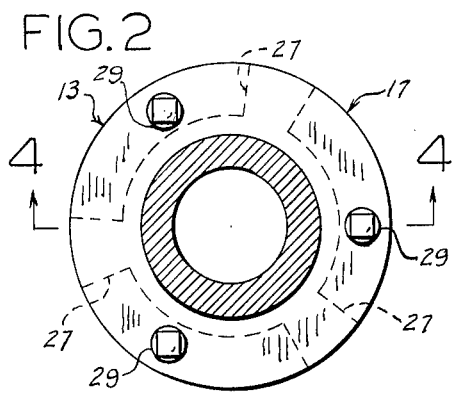
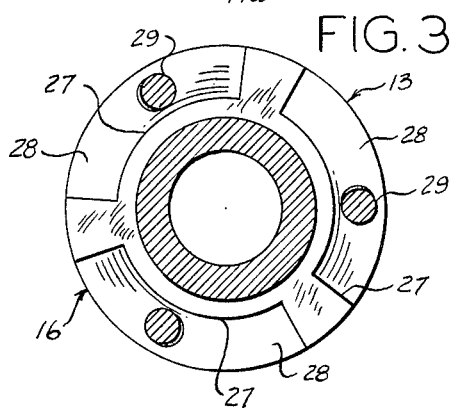
INVENTOR.
LEE A. TURZILLO
BY William Cleland
Attorney – # United States Patent Office 3,240,513
Patented Mar. 15, 1966

3,240,513
CONTINUOUS FLIGHT AUGER CONNECTOR
Lee A. Turzillo, Bath, Ohio
(2078 Glengary Road, Akron 13, Ohio)
Filed Nov. 27, 1963, Ser. No. 326,536
3 Claims. (Cl. 285—90)

This invention relates to continuous flight, hollow-shafted augers, and particularly relates to a fluid-sealing connector for a sectional auger-type drill.

Heretofore, hollow, sectional, continuous-flight augers for installation of cast-in-place concrete piles, for example, have been assembled in various lengths by means of connectors. The most convenient and economical device, however, has included welding or otherwise affixing interchangeable, complementally threaded connector portions on adjacent ends of the auger sections. The threaded connector, however, could be accidentally unscrewed by reverse rotation of the auger, which rendered the auger useless and frequently caused property damage and/or personal injury. Occasionally auger sections disconnected in an augered hole could not be retrieved.

Locking devices, employed to prevent unscrewing of the connector parts, were unsatisfactory because they required precise alignment of interlocking parts at the exact point of full threaded connection of the threaded portions, which was not possible when the threads and other frictionally engaged portions started to wear. Continued wear on the threads caused loosening of the threaded parts, which in turn caused looseness and misalignment of the auger sections, and premature replacement of the threaded parts of the connector became necessary.

An object of the present invention is to provide an auger connector including threaded portions, and improved means for rigidly locking the same against loosening regardless of direction of rotation of the auger and/or of the wear on threaded and other portions of the connector in continued use.

Another object of the invention is to provide an improved connector means for attaching and detaching auger or like drill sections with a minimum of effort and expense.

Another object of the invention is to provide an economical, connector of the character described, the complementally interfitting parts of which are adapted to be safely and interchangeably used with complementally interfitting parts of like connector units.

Other objects of the invention will be manifest from the following brief description and the accompanying drawings.

Of the accompanying drawings:

FIGURE 1 is a side elevation, partly broken away, of a continuous flight, hollow shaft auger in which is incorporated one embodiment of the improved connector of the invention.

FIGURE 2 is an enlarged horizontal cross-section taken substantially on the line 2—2 of FIGURE 1.

FIGURE 3 is a horizontal cross-section, on the same scale as FIGURE 2, taken substantially on the line 3—3 of FIGURE 1.

FIGURE 4 is a vertical cross-section, on the same scale as FIGURES 2 and 3, taken substantially on the line 4—4 of FIGURE 2.

Referring to the drawings generally, there is illustrated two sections 10 and 11 of a continuous flight, hollow-shafted auger 12, rigidly connected together by means of a two-part connector 13. The auger 12 is of a type which, for example, is used for augering a cast-in place concrete pile, utilizing pressurized concrete materials pumped through the auger into open areas and lateral seams in the augered hole, in known manner. Any number of additional auger sections 11 may be connected as needed, by means of connectors 13.

As best shown in FIGURES 1 and 4, connector 13 includes oppositely disposed, hollow mating parts 16 and 17 having stems 18 and 19 suitably welded at ends 16a and 17a thereof to ends 14a and 15a of hollow auger shafts 14 and 15, respectively. Flanged or enlarged, inwardly opposed ends 20 and 21 of the parts 16 and 17, respectively, have axially inwardly opposed flat machined end faces 22 and 23 in positive abutment, when an externally threaded axial extension 24 of part 18 is in full threaded reception within an internally threaded recess 25 extending axially inwardly of end face 23 of part 16. In this full threaded condition, a beveled or conical end 26 of extension 23 will be complementally seated in a conical seat 26a at the inner end of threaded recess 25.

Thus, in the relationship just described, where right-hand square threads are provided, clockwise rotation of the auger 12 will tend to tighten the threaded connector 13, but reverse rotation would tend to unscrew or uncouple the connector, and could cause serious damage as previously described. To obviate this defect found in prior art devices, a plurality of equally peripherally spaced recesses or slots 27 may be provided in the flat face 22, of connector part 16, to define axially outwardly presented cam faces 28, 28, which incline with respect to the plane of the abutting faces 22 and 23, in the same peripheral direction as the inclination of the right hand threads of extension 24 (see FIGURE 4). A plurality of set screws 29, 29 are threaded, in correspondingly spaced relation, through outwardly exposed portions of the flange 21 of connector part 17, and are adjustable to fixed positions to which machined, flat inner ends 30 of the set screws 29 are positively engaged with the respective cam surfaces 28, as shown in FIGURES 1, 3 and 4. This arrangement is such that counter-clockwise or reverse rotation of the entire auger in use, tending to unscrew and loosen the connector 16, will immediately meet opposing resistance of the inner ends of the set screws against the inclined cam surfaces 28.

It should be noted, that the aforesaid locking action is positive in effect. That is, the forces opposing unscrewing of the connector parts 16 and 17 are compressive, axially between said parts, through the several wedging screws 29. Accordingly, there is no question of the screws 29 being under damaging shear stresses, as in the case of certain prior art structures.

In use of the auger assembly, as best shown in FIGURE 1, such as to auger a hole in the earth for installation of a cast-in-place pile, the auger is rotated in clockwise direction. Earth removed in forming the hole is drawn upward by the continuous flighting of the auger, and concrete materials are forced into the formed hole, including open areas and lateral seams within the hole, to form the cast-in-place pile. In any event, when reverse rotation of the auger becomes necessary or desirable the same may be accomplished without unscrewing the connector, due to the wedge-like locking action of the set screws 29 against the inclined cam surfaces 28. Each time connector parts 16 and 17 are threadedly connected, tightly to join two auger sections as previously described, the wedging screws 29 are tightened against the inclined cam surfaces 28, also as described above, rigidly to lock the respective connecting auger sections together. With use of the improved wedge-locking means described, there is substantially no likelihood that the connector 13 will become loose and make the auger sections wobbly, even after long continued use resulting in substantial wearing away of threaded parts.

Thus has been provided an improved connector for auger or like drill sections, which accomplishes the stated

What is claimed is:

1. A connector for releasable attachment of adjoining sectional auger flight or like drill parts, comprising: oppositely disposed stem portions constituting integral ends of said parts, each terminating in integral end portions having radially outwardly presented flange means and opposed mating end faces in abutment; one said stem end portion having an internally threaded recess extending axially inwardly of the end face thereof and the other stem end portion having an externally threaded axial extension threadedly received in said threaded recess and tightened to said position of abutment of said mating end faces; the flange means of at least one of said integral end portions having at least one recessed portion therein defining a cam surface facing axially outwardly thereof, and being inclined in the same peripheral direction as the inclination of the threads of said axial extension for a given direction of tightening rotation of the axial extension; the flange means of the other said integral end portion having an element threaded therein to a fixed position of threaded adjustment of the element in which the inner end of the element is in positive engagement with said inclined cam surface opposing unthreading reverse rotation of the stem portions, whereby the connector is locked against unscrewing of said stem ends by reverse rotation of the connected drill parts.

2. A connector as in claim 1, said abutting stem portions having a fluid passageway axially therethrough, and the stem portions having complemental seating portions in fluid-sealing engagement at the inner end of said threaded recess.

3. A connector as in claim 1, said one stem portion having a plurality of said cam surfaces in peripherally spaced relation, and said other stem portion having a plurality of peripherally spaced said threaded elements adjustable for said frictional engagement of inner ends thereof with corresponding said cam surfaces.

References Cited by the Examiner

UNITED STATES PATENTS

| | | | |
|---|---|---|---|
| 448,183 | 3/1891 | Gledhill | 285—90 X |
| 1,079,681 | 11/1913 | Wintroath | 285—333 |
| 1,148,977 | 8/1915 | Lowe | 287—125 X |
| 1,176,215 | 3/1916 | Griffin | 285—91 |
| 1,969,531 | 8/1934 | Swedler | 285—92 |
| 3,086,796 | 4/1963 | Yancey | 151—31 |

FOREIGN PATENTS 111,696   12/1917   Great Britain.

CARL W. TOMLIN, *Primary Examiner.*